(12) United States Patent
Diehl et al.

(10) Patent No.: US 8,135,131 B2
(45) Date of Patent: Mar. 13, 2012

(54) METHOD FOR CALCULATING COMPRESSED RSA MODULI

(75) Inventors: Eric Diehl, La Buzardiere (FR); Marc Joye, Cesson-Sevigne (FR)

(73) Assignee: Thomson Licensing, Issy-les-Moulineaux (FR)

( * ) Notice: Subject to any disclaimer, the term of this patent is extended or adjusted under 35 U.S.C. 154(b) by 935 days.

(21) Appl. No.: 12/154,869

(22) Filed: May 28, 2008

(65) Prior Publication Data

US 2009/0323934 A1 Dec. 31, 2009

(30) Foreign Application Priority Data

May 31, 2007 (EP) .................................... 07301082
Oct. 29, 2007 (EP) .................................... 07301509

(51) Int. Cl.
*H04L 9/00* (2006.01)
(52) U.S. Cl. ............................................. 380/30; 380/28
(58) Field of Classification Search .................... 380/30, 380/28
See application file for complete search history.

(56) References Cited

U.S. PATENT DOCUMENTS

| | | | | |
|---|---|---|---|---|
| 6,134,325 A | * | 10/2000 | Vanstone et al. | 380/30 |
| 6,304,658 B1 | * | 10/2001 | Kocher et al. | 380/30 |
| 6,377,689 B1 | * | 4/2002 | Vanstone et al. | 380/259 |
| 2004/0086115 A1 | | 5/2004 | Laih et al. | |
| 2006/0137006 A1 | * | 6/2006 | Ramzan et al. | 726/21 |

OTHER PUBLICATIONS

Ronald Cramer et al. "Signature Schemes Based on the Strong RSA Assumption" ACM Transactions on Information and System Security, vol. 3, Issue 3, Aug. 2000. pp. 161-185.*
Vanstone S A et al.: Short RSA Keys and Their Generation Journal of Cryptology, New York, NY US vol. 8, No. 8, 1995, pp. 101-114 XP000853671.
Lenstra A K: "Generating RSA moduli with a predetermined portion" Lecture Notes in Computer Science, Springer Verlag, Berlin, DE, No. 1514, Oct. 1998, pp. 1-10, XP002108059.
European Search Report dated Dec. 19, 2007.

* cited by examiner

*Primary Examiner* — Kim Vu
*Assistant Examiner* — Thomas Gyorfi
(74) *Attorney, Agent, or Firm* — Myers Wolin, LLC

(57) ABSTRACT

A method for generating a compressed RSA modulus, allowing up to two thirds of the bits of a modulus N to be fixed. N has a predetermined portion $N_H$, which comprises two parts $N_h$ and $N_m$. A candidate RSA modulus that shares the $N_h$ part is generated, and the candidate is then modified using Euclidian-type computations until it shares both $N_h$ and $N_m$. Also provided is an apparatus for calculating compressed RSA moduli according to the method and a computer program product.

8 Claims, 2 Drawing Sheets

```
RSA2048 = c7970ceedcc3b075  4490201a7aa613cd  73911081c790f5f1  a8726f463550bb5b
          7ff0db8e1ea1189e  c72f93d1650011bd  721aeeacc2acde32  a04107f0648c2813
          a31f5b0b7765ff8b  44b4b6ffc93384b6  46eb09c7cf5e8592  d40ea33c80039f35
          b4f14a04b51f7bfd  781be4d1673164ba  8eb991c2c4d730bb  be35f592bdef524a
          f7e8daefd26c66fc  02c479af89d64d37  3f44270 9439de66c  eb955f3ea37d5159
          f6135809f85334b5  cb1813addc80cd05  609f10ac6a95ad65  872c909525bdad32
          bc7295264292012f  4c61dc5b3c3b7923  e56b16a4d9d373d8  721f24a3fc0f1b31
          31155615172866bc  cc30195054c824e7  33a5eb6817f7bc16  399d48c6361cc7e5
       p = f2cb1408c0712b00  bb40d1ff5ef0d42b  981ba43a174da647  a474918aea017483
          e840e140d522a09   da65cb960a912c3f  5bf031af675b7907  5f5eb2151ad9c0ff
          7bd518dd0f01bdc2  ac68f8b8edd30426  7b58d3317ab47072  4a04313d85be7d88
          f63fe405a7628b12  3b34217ca4d45e42  97b5d728c2f74cd9  7fa673e6483804f5
       q = d2719ab388ad9e05  e9f46df9ce8c822e  de61d36a7ce61b6c  a4d3b4a3b41a8f42
          0935eec7ce1a57c1  2e15bfaf4873e2d2  095297c6fd8d49d9  8ef44b955a983ba9
          75f9f1be4f1730fb  2e9834e075988ed0  9229cb1514998172  7c1b58d2e20932d5
          25a06de1111311af  5a88ae25f3e27e3d  c2c44e9b51ffae50  2ed18dd903907931
      p*q = c7970ceedcc3b075  4490201a7aa613cd  73911081c790f5f1  a8726f463550bb5b
          7ff0db8e1ea1189e  c72f93d1650011bd  721aeeacc2acde32  a04107f0648c2813
          a31f5b0b7765ff8b  44b4b6ffc93384b6  46eb09c7cf5e8592  d40ea33c80039f35
          b4f14a04b51f7bfd  781be4d1673164ba  8eb991c2c4d730bb  be35f592bdef524a
          f7e8daefd26c66fc  02c479af89d64d37  3f44270 9439de66c  eb955f3ea37d5159
          f6135809f85334b5  cb18fd5b056dbd78  01de0bb2fd1e7b5a  b4d33205ac4c9a71
          800cbfe76ac1424a  90121c232d945edc  6e7d34038e271b4c  92b620e5ddf836da
          62eede67b33ab2b4  ae58d531cf27f090  603420 1bf753711e  24417374f5e0bfe5
```

*FIG. 2*

METHOD FOR CALCULATING COMPRESSED RSA MODULI

This application claims the benefit, under 35 U.S.C. §119 of European Patent Application 07301082.9, filed May 31, 2007 and European Patent Application 07301509.1 of Oct. 29, 2007.

FIELD OF THE INVENTION

The present invention is generally directed to cryptography, and in particular to compressed RSA moduli.

BACKGROUND OF THE INVENTION

This section is intended to introduce the reader to various aspects of art, which may be related to various aspects of the present invention that are described and/or claimed below. This discussion is believed to be helpful in providing the reader with background information to facilitate a better understanding of the various aspects of the present invention. Accordingly, it should be understood that these statements are to be read in this light, and not as admissions of prior art.

To generate so-called Rivest-Shamir-Adleman (RSA) moduli for use in public cryptography one may proceed as follows.

Let N=pq be the product of two large primes. Let e and d denote a pair of public and private exponents, satisfying $$ed \equiv 1 (\mod \lambda(N)),$$

with $\gcd(e, \lambda(N))=1$ and $\lambda$ being Carmichael's function. As N=pq, we have $\lambda(N)=1$ cm(p−1, q−1). Given x<N, the public operation (e.g., message encryption or signature verification) consists in raising x to the e-th power modulo N, i.e., in computing $y=x^e$ mod N. Then, given y, the corresponding private operation (e.g., decryption of a ciphertext or signature generation) consists in computing $y^d$ mod N. From the definition of e and d, we obviously have that $y^d \equiv x$ (mod N). The private operation can be carried out at higher speed through Chinese remaindering (CRT mode). Computations are independently performed modulo p and q and then recombined. In this case, private parameters are $\{p, q, d_p, d_q, i_q\}$ with $$d_p = d \mod(p-1),$$

$$d_q = d \mod(q-1), \text{ and}$$

$$i_q = q^{-1} \mod p.$$

We then obtain $y^d$ mod N as $$CRT(x_p, x_q) = x_q + q[i_q(x_p - x_q) \mod p]$$

where $x_p = y^{d_p}$ mod p and $x_q = y^{d_q}$ mod q.

In summary, a RSA modulus N=pq is the product of two large prime numbers p and q, satisfying $\gcd(\lambda(N), e)=1$. If n denotes the bit-size of N then, for some $1 < n_0 < n$, p must lie in the range $[2^{n-n_0-1/2}, 2^{n-n_0}-1]$ and q in the range $[2^{n_0-1/2}, 2^{n_0}-1]$ so that $2^{n-1} < N = pq < 2^n$. For security reasons, so-called balanced moduli, with $n=2n_0$, are generally preferred.

Typical present-day RSA moduli range in length from 1024 to 4096 bits, and it has become customary for applications to require moduli of at least 2048 bits. However, there are still programs and/or devices running the RSA-enabled applications that are designed to support only 1024-bit moduli.

It will be appreciated a solution that enables the compression moduli so that they can fit in shorter buffers or bandwidths would be greatly beneficial. Rather than storing/sending the whole RSA moduli, a lossless compressed representation is used. This also solves compatibility problems between different releases of programs and/or devices. In addition, such techniques can be used for improved efficiency: savings in memory and/or bandwidth.

One such solution is described by Vanstone and Zuccherato in "Short RSA Keys and Their Generation", Journal of Cryptology, New York, N.Y., US, vol. 8, no. 8, 1995, pages 101-114, XP000853671. The solution enables specification of up to N/2 leading bits, but it is rather complicated, requiring e.g. factorization of the number given by the specified bits. In addition, the resulting moduli are relatively easy to factor.

Another such solution is described by Lenstra, Arjen K. in "Generating RSA moduli with a predetermined portion"; Advances in Cryptology—ASIACRYPT '98, volume 1514 of Lecture Notes in Computer Science, pp. 1-10; Springer 1998. This solution is an improvement upon the solution by Vanstone and Zuccherato as it is less complicated and as the resulting moduli are more difficult to factor.

However, neither of the prior art methods allow the predetermination of more than half of the bits of an RSA modulus.

The present invention, however, improves on Lenstra's generation method in that it for example allows greater compression.

SUMMARY OF THE INVENTION

In a first aspect, the invention is directed to a method for generating factors of a RSA modulus comprising a predetermined portion that can be larger than one half of the RSA modulus, the RSA modulus comprising at least two factors. First a value of a predetermined portion that the RSA modulus is to share is received. At least two candidate factors whose product shares at least a first part of the predetermined portion are generated. The at least two candidate factors are modified using Euclidean type computations until the resulting factors are prime and a product of the resulting factors fully shares the predetermined portion by using an extension of the Extended Euclidean Algorithm to evaluate a correcting value for each of the at least two factors; and adding respectively the correcting values to the at least two candidate factors to obtain at least two resulting factors; wherein the product of the resulting factors comprises the first shared part and shares the second part of the predetermined portion. Finally, the resulting factors are output in order to allow cryptographic operations using the resulting factors.

In a first preferred embodiment, the RSA modulus is a three-prime RSA modulus.

In a second preferred embodiment, the RSA modulus is of the form $N=p^rq$.

In a third preferred embodiment, the generating step comprises the steps of: choosing a first candidate factor; and calculating a second candidate factor as the integer result of a division of a value and the first candidate factor, so that the product of the candidate factors shares at least the first part of the predetermined portion, the value having as many bits as the RSA modulus and sharing the predetermined portion.

In a fourth preferred embodiment, the extension of the Extended Euclidean Algorithm uses a sequence $\{u_i, v_i, d_i\}$ obtained by the Extended Euclidean Algorithm satisfying a $u_i + b \ v_i = d_i$ with $a = q_0$ and $b = p_0$ to derive two companion sequences $\{x_i\}$ and $\{y_i\}$ given by $$\left\{ x_0 = 0; x_i = x_{i-1} + \left\lfloor \frac{z_{i-1}}{d_i} \right\rfloor u_i \right\}$$

-continued and $$\left\{ y_0 = 0; y_i = y_{i-1} + \left\lfloor \frac{z_{i-1}}{d_i} \right\rfloor v_i \right\}$$

wherein $z_0 = c$ and $z_i = z_{i-1}$ mod $d_i$ with $c = 2^{l-1} + (N_H 2^l$ mod $p_0)$.

In a second aspect, the invention is directed to an apparatus for calculating factors of a RSA modulus comprising a predetermined portion that can be larger than one half of the RSA modulus, the RSA modulus comprising at least two factors. The apparatus comprises a processor adapted to: receive a value of a predetermined portion that the RSA modulus is to share; generate at least two candidate factors whose product shares at least a first part of the predetermined portion; modify the at least two candidate factors using Euclidean type computations until the resulting factors are prime and a product of the resulting factors fully shares the predetermined portion by: using an extension of the Extended Euclidean Algorithm to evaluate a correcting value for each of the at least two factors; and adding respectively the correcting values to the at least two candidate factors to obtain at least two resulting factors; wherein the product of the resulting factors comprises the first shared part and shares the second part of the predetermined portion. The processor is further adapted to output the resulting factors in order to allow cryptographic operations using the resulting factors.

In a third aspect, the invention is directed to a computer program product comprising program code instructions for the execution of the steps of the method according to the first aspect when said program is executed in a processor.

"Sharing" is to be interpreted as having the same value for the part that is shared, e.g. hexadecimal 1234567890abcdef and 123456789abcdef0 share 123456789 in the leading part of the numbers.

BRIEF DESCRIPTION OF THE DRAWINGS

Preferred features of the present invention will now be described, by way of example, with reference to the accompanying drawings, in which:

FIG. 2 illustrates en example of the method of the present invention applied the RSA-2048 challenge.

DETAILED DESCRIPTION OF PREFERRED EMBODIMENTS

The main inventive concept of the present invention is a method of providing a n-bit RSA modulus N for use in generating a key in an RSA-type cryptographic scheme where up to about two thirds of the n bits of N are predetermined.

Figure 1:
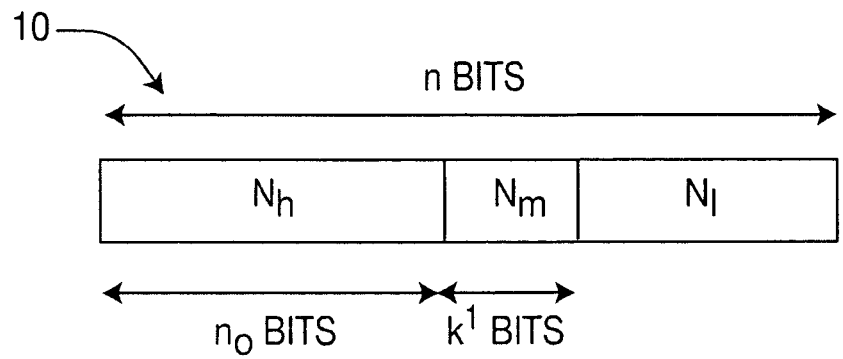
FIG. 1 illustrates an exemplary RSA modulus 10 according to the present invention.

FIG. 1 illustrates an exemplary RSA modulus 10 according to the present invention. $l$ denotes the bit-length of $N_l$. Hence $n = n_0 + k' + l$.

Let $N = pq$ be the product of two large primes where $p$ is $(n-n_0)$-bit integer and $q$ is a $n_0$-bit integer so that $N$ is an n-bit RSA modulus.

First, we compute $p_0$ and $q_0$ as follows.

1. Using a pseudo-random number generator, produce a $(n_0 + k')$-bit integer $N_H$ from a random seed $s_0$:

$N_H := N_h \| N_m = 2^{n_0+k'-1} \vee \text{PRNG}(s_0) \in [2^{n_0-1}, 2^{n_0}-1] \| [0, 2^{k'}-1]$.

The skilled person will appreciate that it is naturally also possible to choose this value.

2. Randomly choose an integer $p_0 \in [\lceil 2^{n-n_0-1/2} \rceil 2^{n-n_0} 1]$.
3. Define $$q_0 = \left\lfloor \frac{N_H 2^l}{p_0} \right\rfloor.$$

The skilled person will appreciate that this choice for $p_0$ and $q_0$ implies that $N_H 2^l - p_0 q_0 = N_H 2^l$ mod $p_0$.

Next, we write $p = p_0 + x$ and $q = q_0 + y$, and $z = xy + 2^{l-1} - N_l$. Hence, we obtain $N = N_H 2^l + N_l = p_0 q_0 + (p_0 y + q_0 x) + xy$ $\Leftrightarrow q_0 x + p_0 y + xy - N_l = N_H 2^l - p_0 q_0$.

$\Leftrightarrow q_0 x + p_0 y + z = 2^{l-1} + (N_H 2^l \bmod p_0)$

We now have to find integer solutions $(x, y, z)$ to the latter equation that fulfil $|xy - z| = N_l - 2^{l-1} | < 2^{l-1}$. For this, we consider the sequence $\{u_i, v_i, d_i\}$ obtained by the Extended Euclidean Algorithm satisfying $a u_i + b v_i = d_i$ with $a = q_0$ and $b = p_0$.

The Extended Euclidean Algorithm produces three sequences: $\{u_i\}$, $\{v_i\}$, and $\{d_i\}$. Below is an extension of the Extended Euclidean Algorithm that produces at least one different sequence implicitly or explicitly based on at least one of the sequences of the Extended Euclidean Algorithm.

Then we define $z_0 = c$ and $z_i = z_{i-1}$ mod $d_i$ with $c = 2^{l-1} + (N_H 2^l \bmod p_0)$ and the two companion sequences $\{x_i\}$ and $\{y_i\}$ given by $$\left\{ x_0 = 0; x_i = x_{i-1} + \left\lfloor \frac{z_{i-1}}{d_i} \right\rfloor u_i \right\}$$

and $$\left\{ y_0 = 0; y_i = y_{i-1} + \left\lfloor \frac{z_{i-1}}{d_i} \right\rfloor v_i \right\}$$

We have $$ax_i + by_i = ax_{i-1} + by_{i-1} + \left\lfloor \frac{z_{i-1}}{d_i} \right\rfloor (au_i + bv_i)$$

$$= ax_{i-1} + by_{i-1} + \left\lfloor \frac{z_{i-1}}{d_i} \right\rfloor d_i$$

$$= ax_{i-1} + by_{i-1} + z_{i-1} - (z_{i-1} \bmod d_i)$$

$$= ax_{i-1} + by_{i-1} + z_{i-1} - z_i$$

$$= ax_0 + by_0 + z_0 - z_i$$

$$= c - z_i$$

as requested, and there is a solution in the required range.

FIG. 2 illustrates en example of the method of the present invention applied the RSA-2048 challenge. As can be seen, the primes p and q generated by the method of the invention are such that the corresponding RSA modulus $N = pq$ matches the RSA-2048 challenge on its upper two thirds (indicated by the underlined hexadecimal figures).

Figure 3:
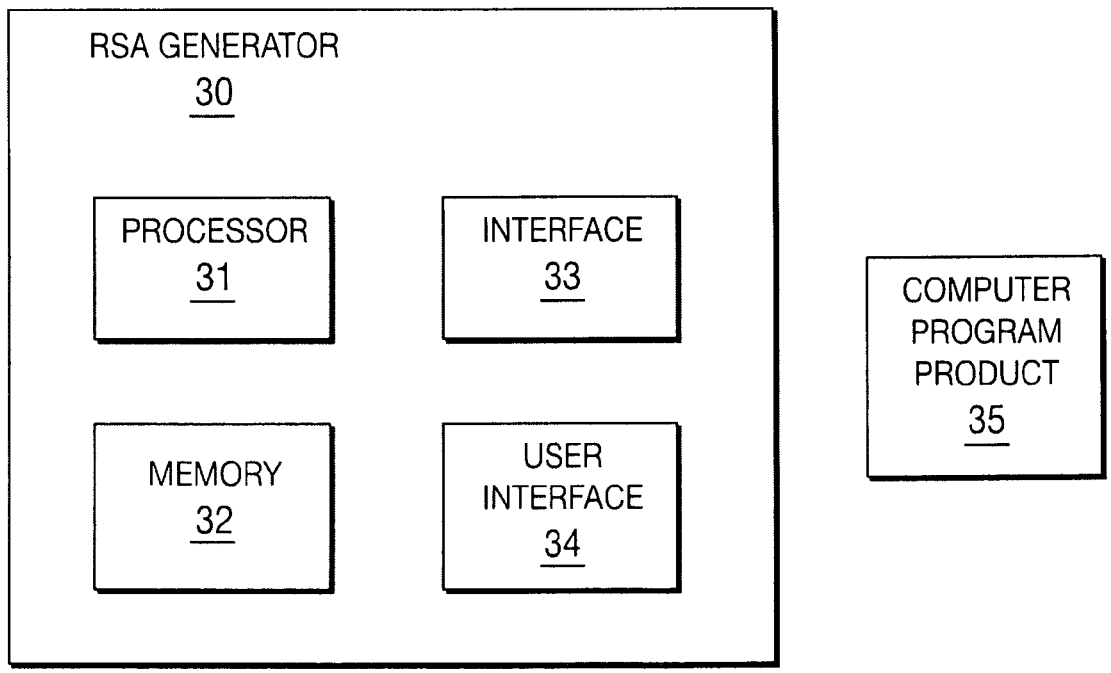
FIG. 3 illustrates an apparatus; for calculating compressed RSA moduli.

FIG. 3 illustrates an apparatus adapted to calculate RSA moduli. The apparatus 30 comprises a processor 31, which may be a single processor or a combination of several processors, a memory 32, a communication interface 33 that may be adapted to receive program code for executing the method from a storage medium 35 storing such program code, and a user interface 34.

The processor 31 is adapted to generate RSA moduli, preferably according to the preferred method of the invention, the memory 32 is adapted to store data, and the communication interface 33 is adapted to communicate with other devices.

The apparatus 30 is adapted to receive, via either the communication interface 33 or the user interface 34, a predetermined portion $N_H$ as input for calculating one or more RSA modulus that share the predetermined portion $N_H$. When the modulus has been calculated, the device outputs the modulus through the user interface or, preferably, to another device for use in RSA cryptography.

It will be appreciated that, while the method according to the preferred embodiment of the invention fixes the leading bits of the modulus, it is also possible to fix the trailing bits of modulus N. More generally, it is possible to fix some leading bits and some trailing bits of N, or a number of bits scattered throughout N.

The method of the invention can be adapted to accommodate RSA moduli that are made of more than 2 factors, for example, 3-prime RSA moduli or RSA moduli of the form $N=p^r q$.

The method according to the invention also applies when the common part of RSA modulus N, say $N_H$, is shared among users or is common to all users for a given application. In such a case, there is no need to transmit it or the data needed to reconstruct the common part.

The skilled person will appreciate that RSA moduli generated using the present invention allow communicating parties in data communication system-to-exchange only about one third of the bits of N together with the data necessary to recover the said predetermined portion (a seed in the preferred embodiment).

Furthermore, the party generating the key in the said RSA-type cryptographic scheme may also only store about one third of the bits of N together with the data necessary to recover the said predetermined portion (a seed in the preferred embodiment).

Our new method considerably reduces the transmission and/or the storage requirements in the key generation for use in an RSA-type cryptographic scheme.

The skilled person will appreciate that the invention for example allows generation of compressed RSA moduli.

It will be understood that the present invention has been described purely by way of example. Each feature disclosed in the description and (where appropriate) the claims and drawings may be provided independently or in any appropriate combination. Features described as being implemented in hardware may also be implemented in software, and vice versa.

Reference numerals appearing in the claims are by way of illustration only and shall have no limiting effect on the scope of the claims.

The invention claimed is:

1. A method for generating factors of a RSA modulus comprising a predetermined portion that can be larger than one half of the RSA modulus, the RSA modulus comprising at least two factors, the method comprising the steps of:
   a processor receiving a value of a predetermined portion that the RSA modulus is to share;
   the processor generating at least two candidate factors whose product shares at least a first part of the predetermined portion;
   the processor modifying the at least two candidate factors using Euclidean type computations until the resulting factors are prime and a product of the resulting factors fully shares the predetermined portion by:
      using an extension of the Extended Euclidean Algorithm to evaluate a correcting value for each of the at least two factors;
      wherein the extension of the Extended Euclidean Algorithm uses a sequence $\{u_i, v_i, d_i\}$ obtained by the Extended Euclidean Algorithm satisfying a $u_i + b\, v_i = d_i$ with $a = q_0$ and $b = p_0$ to derive two companion sequences $\{x_i\}$ and $\{y_i\}$; and
      adding respectively the correcting values to the at least two candidate factors to obtain at least two resulting factors;
      wherein the product of the resulting factors comprises the first shared part and shares the second part of the predetermined portion; and
   the processor outputting the resulting factors in order to allow cryptographic operations using the resulting factors.

2. The method of claim 1, wherein the RSA modulus is a three-prime RSA modulus.

3. The method of claim 1, wherein the RSA modulus is of the form $N=p^r q$.

4. The method of claim 1, wherein the generating step comprises the steps of:
   choosing a first candidate factor; and
   calculating a second candidate factor as the integer result of a division of a value and the first candidate factor, so that the product of the candidate factors shares at least the first part of the predetermined portion, the value having as many bits as the RSA modulus and sharing the predetermined portion.

5. The method of claim 1, wherein the two companion sequences $\{x_i\}$ and $\{y_i\}$ are given by $$\left\{ x_0 = 0;\ x_i = x_{i-1} + \left\lfloor \frac{z_{i-1}}{d_i} \right\rfloor u_i \right\}$$

and $$\left\{ y_0 = 0;\ y_i = y_{i-1} + \left\lfloor \frac{z_{i-1}}{d_i} \right\rfloor v_i \right\}$$

wherein $z_0 = c$ and $z_i = z_{i-1} \bmod d_i$ with $c = 2^{l-1} + (N_H\, 2^l \bmod p_0)$.

6. Computer program product comprising program code instructions embedded in a non-transitory computer-readable medium for the execution of the steps of the method according to claim 1 when said program is executed in a processor.

7. An apparatus for calculating factors of a RSA modulus comprising a predetermined portion that can be larger than one half of the RSA modulus, the RSA modulus comprising at least two factors, the apparatus comprising a processor adapted to:
   receive a value of a predetermined portion that the RSA modulus is to share;
   generate at least two candidate factors whose product shares at least a first part of the predetermined portion;
   modify the at least two candidate factors using Euclidean type computations until the resulting factors are prime and a product of the resulting factors fully shares the predetermined portion by:
      using an extension of the Extended Euclidean Algorithm to evaluate a correcting value for each of the at least two factors;
      wherein the extension of the Extended Euclidean Algorithm uses a sequence $\{u_i, v_i, d_i\}$ obtained by the Extended Euclidean Algorithm satisfying a $u_i + b\, v_i = d_i$ with $a=q_0$ and $b=p_0$ to derive two companion sequences $\{x_i\}$ and $\{y_i\}$; and adding respectively the correcting values to the at least two candidate factors to obtain at least two resulting factors;

wherein the product of the resulting factors comprises the first shared part and shares the second part of the predetermined portion; and output the resulting factors in order to allow cryptographic operations using the resulting factors.

8. The apparatus of claim 7, wherein the two companion sequences $\{x\}$ and $\{y_i\}$ are given by $$\left\{x_0 = 0; x_i = x_{i+1} + \left\lfloor \frac{z_{i-1}}{d_i} \right\rfloor u_i\right\} \text{ and } \left\{y_0 = 0; y_i = y_{i+1} + \left\lfloor \frac{z_{i-1}}{d_i} \right\rfloor v_i\right\}$$

wherein $z_0=c$ and $z_i=z_{i-1} \bmod d_i$ with $c=2^{l-1} + (N_H 2^l \bmod p_0)$.

* * * * *